United States Patent [19]
Denen

[11] Patent Number: 4,658,419
[45] Date of Patent: Apr. 14, 1987

[54] TELEPHONE RINGER CIRCUIT

[75] Inventor: Dennis J. Denen, Columbus, Ohio

[73] Assignee: Floyd Bell Associates, Inc., Columbus, Ohio

[21] Appl. No.: 285,628

[22] Filed: Jul. 22, 1981

[51] Int. Cl.$^4$ .............................................. H04M 1/00
[52] U.S. Cl. .................................. 379/375; 340/384 E
[58] Field of Search .................. 179/84 T, 84 R, 84 A; 340/384 E

[56] References Cited

U.S. PATENT DOCUMENTS

| | | | |
|---|---|---|---|
| 3,867,585 | 2/1975 | Morstadt | 179/84 T |
| 4,157,459 | 6/1979 | Bush et al. | 179/84 T |
| 4,214,131 | 7/1980 | Bush et al. | 179/84 T |
| 4,346,265 | 8/1982 | Boss et al. | 179/84 T |

Primary Examiner—James L. Dwyer
Attorney, Agent, or Firm—Mueller and Smith

[57] ABSTRACT

A telephone ringer circuit having a ring signal detection network serving to detect ring signals utilizing an R-C network and operating in conjunction with a threshold responsive detection device. Upon the detection of a valid ring signal, the resistance component of the R-C network is by-passed to permit low impedance passage of electrical energy into the ringing components of the circuit. Drive for a piezoelectric crystal driven audio output is provided by two push-pull amplification stages, configured as integrators, so as to effect crystal drive with trapezoidal shaped waveforms wherein high harmonics are not evolved. Improved loudness and sound quality are achieved with the circuit.

20 Claims, 5 Drawing Figures

TELEPHONE RINGER CIRCUIT

BACKGROUND

The ringers or audio devices of conventional telephone subsets are designed for audibly responding to ringing signals applied thereto from along typical tip and ring leads of subscriber lines. Generally, this a.c. ringing signal will be asserted intermittently in about one second intervals at a frequency of between about 16 to 60 Hertz and at a voltage in the range of about 50-110 v. For the most part, telephone ringers are of the electromechanical type, an inductive component actuating a bell clapper for the duration of the applied ringing signal.

Because of their inherent bulk and relatively large power consumption characteristics, the electromechanical ringers are being replaced in telephonic product designs by piezoelectric driven diaphragms or small loudspeakers operating in conjunction with solid state integrated ring logic circuits. While the piezoelectric ringers promise the advantages of low power consumption and small size, their implementation as practical components has been seen to encounter a variety of technical difficulties.

Inasmuch as telephone system line networks extend within a broad range of environments, a variety of spurious signals are developed upon them and it becomes necessary for the ringing circuits to distinguish a valid ringing signal from spuriously derived pulses. Some of these spurious signals exhibit quite high voltages, lightning generated signals reaching 1,000 volts and higher. Other signals which require rejection can be generated at the subscriber's telephone itself. For instance, an audible output referred to in the industry as "bell-tapping" may be derived during the course of the dialing operation. Inasmuch as a significant amount of current flows during dialing, the long lines associated with the telephone network exhibit an inductance to an extent wherein inductive spikes may be generated as current is terminated which may actuate a ringer circuit. Accordingly, the logic circuits associated with ringers must be capable additionally of distinguishing bell-tapping phenomena and rejecting such signals. In effect, the ringer circuits must be capable of evaluating an incoming signal in a manner wherein its periodic nature is recognized, following which, the circuit must accept the ring signal. Preferably, the circuits will observe 2 to 4 cycles of the periodic ring signal in the process of detecting it.

Another aspect of the design of solid-state ringing devices is concerned with the quality of audio output achieved. In this respect, there resides a need to achieve a necessary level of volume or loudness. The energy available for driving the associated piezoelectric components should only be that derived from the ringing signal itself. Thus, impedance defining components must be minimized or otherwise effectively treated. In addition to achieving necessary loudness, it also is necessary to develop a sound quality which is pleasing to the consuming public. It is desirable in this regard to excite the piezoelectric element of the sound producing diaphragm at two frequencies at a distinct warble rate. Improper selection of the latter warble rate effects the generation of a raucous sound, while the excitation frequencies themselves should be carefully chosen for sound quality. Generally, the two frequencies should be somewhat close to achieve this quality.

SUMMARY

The present invention is addressed to a telephone ringer having a highly effective energy responsive ring signal detection network which, in addition to accurately distinguishing ring signals from spurious noise pulses, also achieves a low impedance conveyance of energy to a piezoelectric sound transducer. The result of this efficient transfer of energy is to achieve a corresponding higher level or louder sound output utilizing the energy available only in the ring signal itself.

As another apsect and object of the invention, an efficient, push-pull digitally controlled drive is asserted at the noted piezoelectric element, which drive is treated to improved sound production performance both from the standpoint of energy utilization and audio quality. More particularly, the drive pulse train is slew rate controlled such that the high harmonic content of the otherwise square wave drive is, in effect, reduced relative to the level of the fundamental to improve sound and power utilization. As a consequence, resistance components having the purpose of eliminating initial surge currents occasioned by the capacitive aspect of the piezoelectric crystals are eliminated and the power dissipation otherwise caused thereby is not present.

As another object of the invention, a telephone ringer circuit as above described is provided having the attributes of being manufactured in integrated circuit form to provide enhanced enconomy of fabrication. The resultant "chip" is one incorporating an SCR clamping network which functions to substantially protect the ringer circuit from voltage excursions and the like caused by lightning and other external effects, such noise rejection being provided within the small chip itself.

As another feature and object of the invention, a telephone ringer circuit is provided which includes a conductive arrangement which is connectible to receive telephonic signals such as ring and talk signals. A rectifier is provided having an input coupled to receive these telephonic signals for rectifying them and providing a corresponding d.c. signal at an output. Talk disconnect components are coupled with the output of the rectifier for blocking the d.c. signals produced by a.c. levels associated with talk signals and for conducting d.c. signals above that level at an output. An energy responsive network is provided which includes a resistor coupled with the talk disconnect output and which is connectible in charging relationship with a capacitor, for example, the filter capacitor generally provided with ringer circuits. A first switching arrangement which normally enables a discharge path for the capacitor is provided along with a second switching arrangement which normally enables the charge of the capacitor through the resistor and which is actuable to effect a low impedance current conveying by-pass of the resistor. A detect network is provided which is responsive to charge values developed on the capacitor representing a d.c. signal corresponding with a ring signal to assume an operational condition actuating the first and second switching arrangements. As such, the bypassing of the capacitor charging resistor permits the passage of ring signal energy into the sound producing elements of the ringer circuit at minimum energy dissipation. An oscillator network is provided which is energizable for generating squarewave outputs and a driver circuit is provided which is connectible with a piezoelectric drive element and is reponsive to the squarewave outputs when enabled to effect energization of that element. A control circuit is provided which is responsive to the detect network when the latter is in its operational condition for effecting the energization of the oscillator network, as well as the enablement of the drive circuit and energization of the piezoelectric drive element.

As another object of the invention, a telephone ringer circuit for use in driving the piezoelectric crystal of an audio device is provided which includes the above-noted arrangement for receiving telephonic signals, the rectifier arrangement and the talk disconnect components.

Additionally, an energy responsive network is provided which is coupled to receive the d.c. signals conducted from the talk disconnect components for evaluating and conducting only those d.c. signals corresponding with a valid ring signal. An oscillator network is provided as above and a drive circuit further is provided which includes at least one amplification stage configured as an integrator having an output connected with the piezoelectric crystal and which is energizable. for receiving and selectively amplifying the squarewave signal of the oscillator to generate a substantially trapezoidal wave signal at the amplifier output for exciting the piezoelectric crystal. The control circuit of the arrangement provides for receiving the energy responsive network conducted signals and effecting the energization of the oscillator network and the amplification stage.

Other objects of the invention will, in part, be obvious and will, in part, appear hereinafter.

The invention, accordingly, comprises the apparatus and system possessing the construction, combination of elements, and arrangement of parts which are exemplified in the following detailed disclosure. For a fuller understanding of the nature and objects of the invention, reference should be had to the following Detailed Description taken in connection with the accompanying drawings.

DETAILED DESCRIPTION

Figure 1:
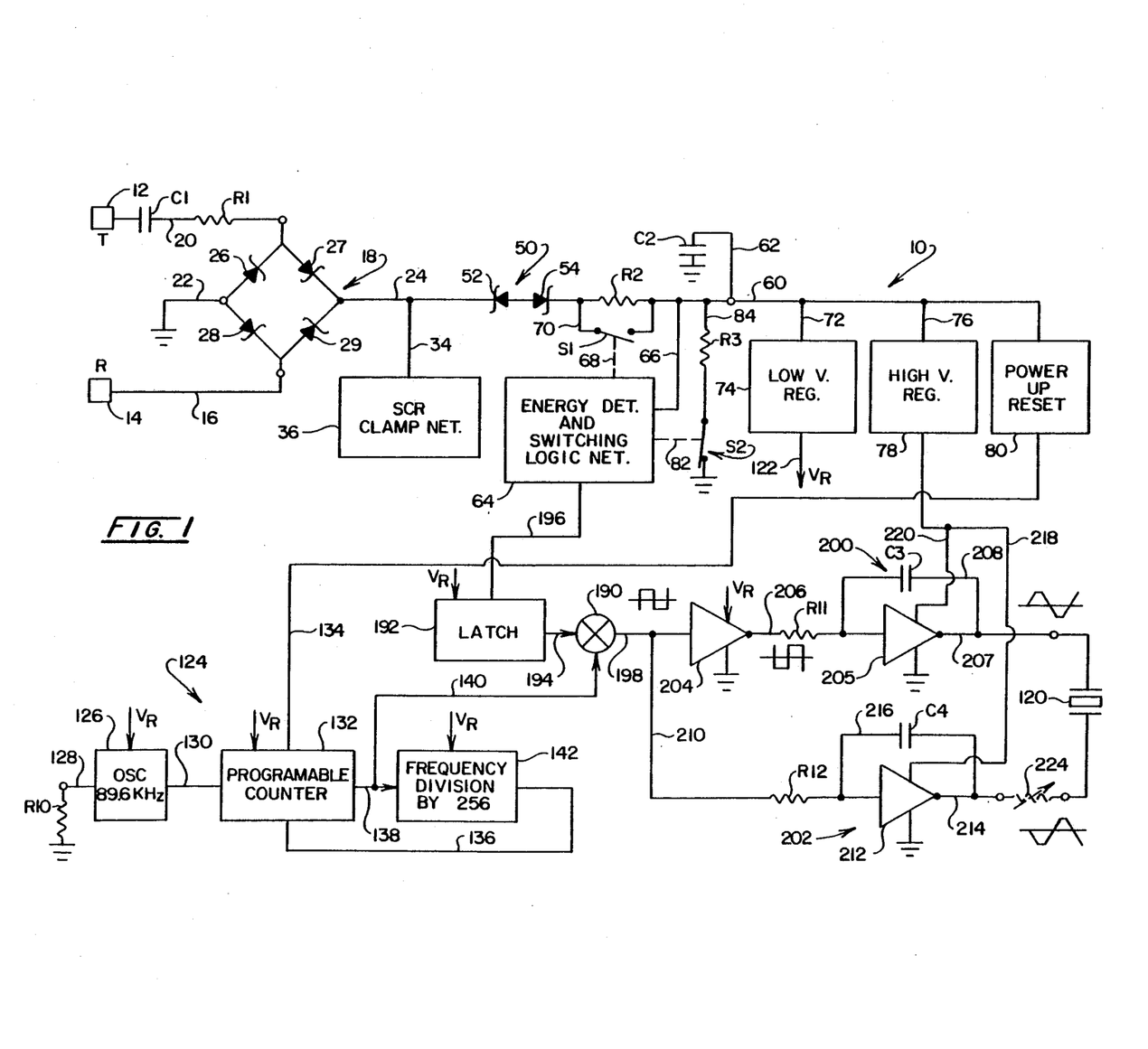
FIG. 1 is a schematic diagram of the telephone ringer circuit of the invention.

Referring to FIG. 1, a general schematic representation of a telephone ringer circuit according to the invention is revealed in general at 10. Circuit 10 preferably is structured for fabrication as a custom integrated circuit or "chip" having a broad range of telephone structure applications. Accordingly, connection points to components located off such chip are represented in the drawings by open circles. Circuits such as at 10 conventionally operate in conjunction with "Tip" (T) and "Ring" (R) signals generated by a telephone system and represented, respectively, at terminal blocks 12 and 14. Block 14 extends through a lead 16 to connection with one side of a full wave bridge rectifier represented generally at 18. Similarly, the Tip input 12 is coupled through a capacitor C1 and limiting resistor R1 within line 20 to the opposite input of rectifier 18. Capacitor C1 generally is provided as a discrete device external to ringer circuit 10 serving to block the d.c. level along the telephone line which otherwise serves a voice generation function. Resistor R1 similarly is present usually as a component external to an integrated circuit chip and generally has a dual function wherein the operating voltage for circuit 10 is adjusted and energy of high voltage pulses as may develop by lightning and similar effects is absorbed, at least to a considerable extent.

Full wave bridge rectifier 18 is shown coupled to ground through line 22 and as providing a d.c. output at line 24. The rectifier is shown comprised of four Schottkey diodes 26–29 all of which may be present as a portion of integrated circuit or, conversely, two of which, for example diodes 28 and 26, may be provided as diodes of conventional structure external with respect to an integrated circuit. In the latter regard, a simplification of chip manufacture may be realized justifying and utilization of external components. It may be observed that the use of a full wave rectifier as at 18 serves to simplify the subsequent ripple filtering of the output at line 24. It should be understood, however, that the circuit will function properly with the use of a half wave rectifier at 18.

Figure 2:
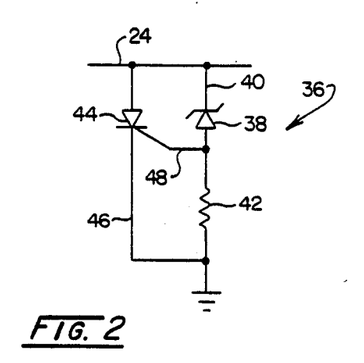
FIG. 2 is a circuit diagram of the SCR clamp network shown in block form in FIG. 1.

Line 24 is shown to be operatively associated via line 34 with block 36 representing an SCR clamping network. Looking additionally to FIG. 2, network 36 is revealed in more detail. The network serves the function of protecting the circuit 10 from spurious noise including the very large pulses generated from lightning or the like which will not have been sufficiently attenuated by resistor R1. Of importance, the network 36 is structured such that the over voltage protection is provided within the integrated circuit chip itself. In operation, the voltage signals at line 24 are continuously monitored by a Zener diode 38 coupled within line 40 to line 24 as well as a trigger point setting resistor 42 and ground. Network 36 further includes a gate controlled thyristor such as SCR 44 coupled within a line 46 extending from line 24 to line 40 at a position intermediate resistor 42 and ground. The gate electrode of SCR 44 is coupled via line 48 to line 40, line 48 being connected therewith at a position intermediate resistor 42 and Zener diode 38. An SCR as at 44 is selected for the integrated circuit inasmuch as it may be formed having a relatively small structure within an integrated circuit while retaining a large power handling capability. In operation, when Zener diode 38 becomes forward biased by an excessive voltage at its input from line 24, current commences to flow through associated resistor 42 to evolve a voltage witnessed at line 48. When sufficient voltage is witnessed, SCR 44 is triggered to dissipate the signal to ground and remains in a latched, "on", condition for the duration of the transient, i.e. until the current passing therethrough diminishes to zero. Generally, the value of resistance for resistor 42 is chosen such that when 50 to 100 ma of current flows through Zener diode 38 a sufficient voltage will be derived to trigger SCR 44. In practical terms, the Zener diode 38 will respond to transient voltages at about the 75 volts level and above.

Returning to FIG. 1, the "talk disconnect" components of circuit 10 are revealed in general at 50. Components 40 include a Zener diode 52 which is coupled in series within line 24 with a Schottkey barrier diode 54, the combination of components serving to block rectified a.c. signals at line 24 which are the result of talking activity. Inasmuch as it is important not to load the voice signal with the electronics associated with telephone ringing, it is desirable to provide an effective blockage of talk signals. These signals are of relatively low voltage level (3v. or the like) to the extent that the talk disconnect function 50 represents an open circuit to talk signals. However, where ringing signals are encountered, components 50 readily pass such signals for validation and treatment by the remaining components of circuit 10.

With the assertion of a valid ringing signal at line 24, it becomes necessary for circuit 10 to evaluate the validity of that signal and, following the determination of a valid ringing signal, respond to the energy represented thereby and activate a ringing function. To carry this function out, a resistor R2 is coupled between the output of talk disconnect components 50 at line 24 and line 60. This resistor operates in a timing fashion in conjunction with a filter capacitor C2 shown coupled within line 62 between line 60 and ground. Capacitor C2 carries out a ripple filtering function and in conventional applications is mounted as a discrete component exteriorly of any integrated ringer circuit. For energy detection purposes, however, as noted above, capacitor C2 operates in conjunction with resistor R2. which may be present on the order of 10 K-20 K ohms in a timing network fashion. In this regard, the relatively lengthy duration of ring signals, i.e. on the order of one second, will cause the charging of capacitor C2 through resistor R2 and the resultant voltage build-up will be witnessed by an energy detection and switching logic network represented generally at 64 through an association represented in general by line 66. Where a voltage representing the commencement of a ring signal is detected by network 64, an operational condition ensues wherein a normally open switching arrangement, represented schematically at S1, is actuated by control generally represented by dashed line 68 to effect a low impedance current conveying by-pass of resistor R2, such by-pass being represented by line 70. The resulant low impedance connection of line 24 to capacitor C2 and line 60 ensures the availability of a maximum amount of current effecting full and rapid charging of capacitor C2 and for presentment along line 60. The resultant power transfer serves to provide a highly efficient power source through line 72 at a low voltage regulator network 74 for carrying out logic component powering; through line 76 to a high voltage regulator network 78 to provide a power source for the drive function of circuit 10 and to power up reset network 80 which serves a conventional logic component initialization function.

Essentially simultaneously with the actuation of switching function S1, energy detection and switching logic network 64, asserts an actuating control represented by dashed line 82 serving to open a switching function S2 positioned within line 84. Line 84 is connected between line 60 and ground and includes a discharge resistor R3 intermediate line 60 and switching function S2. Switching function S2 is normally closed and noted actuation effects the opening thereof and resultant blockage of a discharge path for filter capacitor C2 through resistor R3 to ground. Switching function S2, operating in conjunction with resistor R3 provides the noted discharge function for capacitor C2 to effect the removal of unwanted energy pulses of relatively short duration as compared to a ring signal. Such noise pulses may be generated by bell-tapping phenomena and the like. Thus, upon the assertion of a relatively short duration spurious noise pulse, capacitor C2 normally is discharged to render the remainder of the circuit immune from spurious noise passing talk disconnect components 50. As is apparent, the switching functions S1 and S2 may be implemented in solid-state fashion for purposes of integrated design and this implemention as well as an embodiment for energy detection and switching logic network is revealed in FIG. 3.

Figure 3:
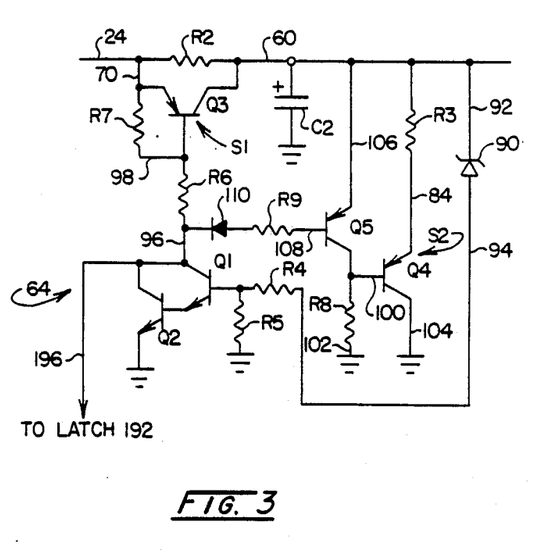
FIG. 3 is a schematic circuit diagram showing the energy detection and switching logic network revealed in block form in FIG. 1.

Looking to FIG. 3, filter capacitor C2, resistors R2 and R3 and lines 24 and 60 again are reproduced in conjunction with logic control components representative of switching functions S1 and S2 and energy detection and switching logic network 64. The voltage level at line 60 as derived in conjunction with resistor R2 and filter capacitor C2, operating as described above, is monitored by a Zener diode, for example having a 9.1 voltage rating which commences to conduct at such time as the voltage at filter capacitor C2 rises to a sufficient level, i.e. something over 10 volts. Such level will indicate the commencement of a valid ring signal. Zener diode 90 is coupled through line 94 and bias resistor R4 to the base of an NPN transistor $Q_1$ having a common collector connection with an NPN transistor $Q_2$ as well as an emitter to base connection therewith constituting a Darlington formation. A resistor R5 for example of equal rating with resistor R4 also is connected from the base of transistor $Q_1$ to ground, while the emitter of trasistor $Q_2$ is coupled to ground. In conventional fashion, resistor R4 limits the base current of transistor $Q_1$ while resistor R5 insures the turnoff thereof.

With the arrangement shown, as Zener diode 90 commences conduction, Darlington coupled transistor pair $Q_1,Q_2$ is forward biased to conduct to, in turn, draw on PNP transistor $Q_3$ through resistor R6 located within line 96. Resistor R6 scales the drive current to transistor $Q_3$. Transistor $Q_3$, the base of which is coupled with line 96, serves the function of earlier described normally open switch S1 and such labeling is reproduced in combination with a reproduction of shunting line 70. Accordingly, as transistor $Q_3$ is turned on, timing resistor R2 is effectively removed from operational status within circuit 10 and a substantially impedance free path is provided for the transfer of energy into the sound generation components thereof. A resistor R7 additionally is shown coupled within line 98 extending between lines 70 and 96. This resistor insures turnoff of transistor $Q_3$.

Where bell-tapping noise and the like is encountered by the circuit, the relatively short duration noise pulses will cause a slight charging of capacitor C2 through resistor R2 and, following such minor charging, capacitor C2 will be discharged through resistor R3 to ground. In this regard, resistor R3, positioned within line 84 which is reproduced from FIG. 1, is in a path to ground by virtue of the coupling of line 84 with the collector of PNP transistor $Q_4$, the base of which is coupled via line 100 to line 102 incorporating resistor R8 and connecting to ground. The emitter of transistor $Q_4$ is coupled to ground through line 104 and with the arrangement shown, the normal path of discharge for capacitor C2 is through resistor R3, line 84, transistor $Q_4$, lines 100 and 102 and resistor R8. Accordingly, transistor $Q_4$ assumes the normally closed switching function S2 described in connection with FIG. 1. The resistance value of resistor R3 is selected for providing the noted discharge function while not affecting the detection of a valid ring signal.

It may be observed that line 100 extends from the base of transistor Q4 to line 102 which, in turn, is coupled with the collector of a PNP transistor Q5. The emitter of transistor Q5 is coupled via line 106 to line 60 and the base thereof is coupled with line 96 by a line 108 incorporating a biasing resistor R9 and blocking diode 110. With this arrangement, as Darlington transistor pair Q1,Q2 turns on, transistor Q5 is drawn into conduction, to, in turn, turn transistor Q4 off. Consequently, the drain resistor R3 path is blocked to permit a full and rapid charging of filter capacitor C2.

Returning to FIG. 1, with the unblocking passage of ringing signal energy from line 60 into the voltage regulators 74 and 78 as well as into the power up reset function 80, the ringing components of the circuit 10 become active. These ringing components comprise the oscillation, counting, and division operations required to provide a requisite dual frequency control signal for use by the driver stages in conjunction with high voltage regulator 78 to provide a powering output to drive a piezoelectric crystal represented in the drawing at 120. Power to the control logic components of circuit 10 is made available from low voltage regulator 74 as represented by line 122 and labeled $V_R$. The latter label will be seen represented as a power input at the various schematically depicted logic components in the drawing.

The frequency generation components of circuit 10 are represented in general at 124. As discussed above, these components function to generate two frequencies on the piezoelectric crystal 120, a desirable combination of frequencies being, for example, 3200 Hz and 2800 Hz. These two frequencies are alternated preferably at a warble rate of about 11 or 12 Hz. The resultant total three frequencies are generated by using frequency division, essentially carried out with counter components. In this regard, an oscillator is represented at 126 as providing a 89.6 KHz starting frequency. Preferably, such oscillators may be adjusted for frequency selection by "off-board" resistors as represented schematically at resistor R10 positioned within line 128 which extends between oscillator 126 and ground as well as with "on-board" capacitances to effect an ideal minimization of cost.

The basic frequency of oscillator 126 is presented along line 130 to the input of a programmable counter 132 which responds to power up reset commands emanating from power up reset function 80 and presented thereto as represented by line 134. Counter 132 is controlled from line 136 in accordance with the warble frequency rate generated by later division. Program counters as at 132 generally are formed as a series of flip-flop circuits arranged so that, after an input signal thereto has progressed through a specified number of alternations, the counter will reset and provide an output pulse. Programming of the counter is by voltages asserted at appropriate terminals. For the instant application, the counter 132 is programmed to count 32 alternations such that it will divide the basic 89.6 KHz frequency by 32 to provide a 2800 Hz output frequency at line 138 which provides the 2800 Hz output frequency at line 140 connected thereto for essentially one-half of the warble cycle. The 2800 Hz signal further is divided by 256 at divider 142 which produces an output pulse at line 136 after 2800 cycles have been counted for 256 occurrences. The resultant output, representing a time interval, $t_1$, may be represented as 7168/f where f represents the original frequency. The resultant pulse output at line 136 resets counter 132 such that it now divides by the value 28 to provide a 3200 Hz output signal at lines 138 and 140. As before, this frequency signal is monitored for 256 occurrences at a frequency division function 142 to provide a second time interval $t_2$, which is equivalent to 8192/f. Thus when the output at line 136 is high, interval $t_1$ is underway, while when the alternate output at line 136 is low, the interval $t_2$ is occurring. With this arrangement, the total time interval provides an 11.72 Hz warble frequency. While the intervals $t_1$ and $t_2$ are not precisely equal, the difference therebetween is dismissible from the standpoint of achieving a desirable audio output.

Figure 4:
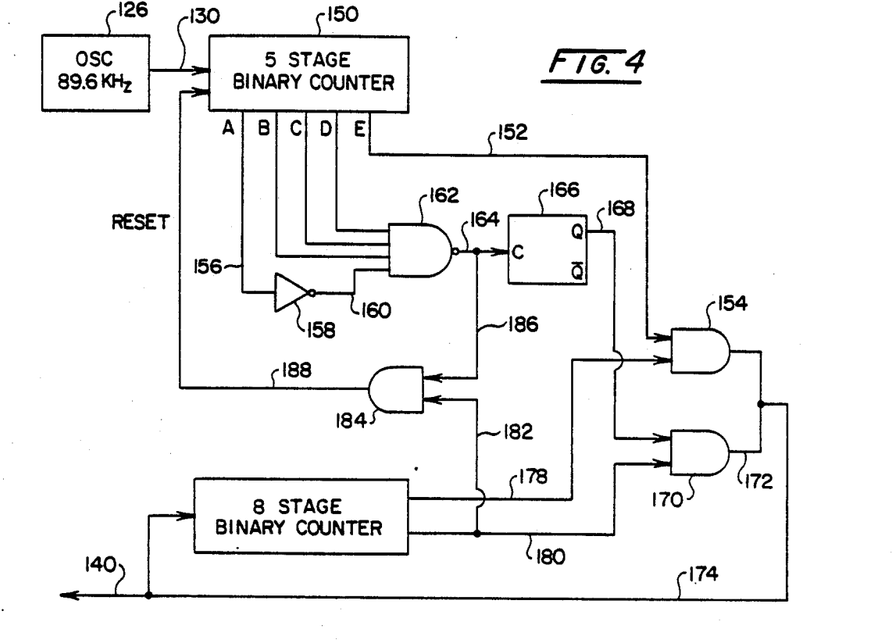
FIG. 4 is a schematic circuit diagram of frequency generation components shown in block form in FIG. 1.
Figure 5:
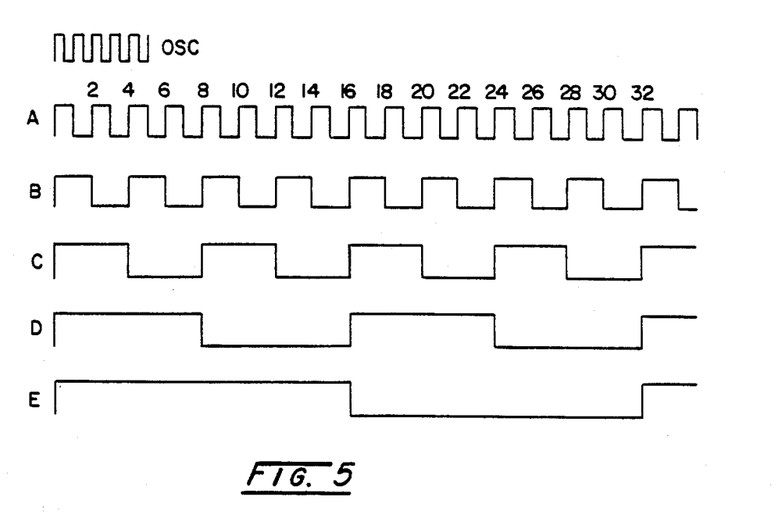
FIG. 5 is a timing diagram associated with the circuit of FIG. 4.

Looking to FIGS. 4 and 5, an implementation of the arrangement described in conjunction with the network represented by components 124 is revealed. In FIG. 4, the output of oscillator 126 again is represented by a line 130 as being directed to an input of a 5-stage binary counter 150. The outputs of counter 150 are labeled A-E representing a progressive division by powers of 2, the output at the line labeled A being a division by 2 and, correspondingly, the output at line 152, labeled E, corresponding with a division by the fifth power of 2 or 32. Accordingly, the signal as presented at line 152 to an AND gate 154 represents the division of the basic frequency of 89.6 KHz by 32, or a frequency of 2800 Hz.

Division by the number 28 requires an analysis of outputs A-D. Looking to FIG. 5, a timing diagram corresponding with outputs A-E is revealed, the cyclical count of the input at line 130 is provided in conjunction with the pulse train represented at output A. The timing diagram reveals that for the fourteenth pulse count, a unique condition is presented wherein the logic value of output A is high, the logic value of output B is low, the logic level of output C is low, and the logic level of output D is low. Accordingly, to locate the fourteenth count, the signal at output A, as represented at line 156, is inverted by an inverter 158 and submitted via line 160 to a NAND gate 162. The output of gate 162 at line 164 represents a division of the clock frequency by 14 and this signal is introduced to the clock input of a conventional flip-flop 166 which serves to carry out a division by 2. Accordingly, the output at the Q terminal of flip-flop 166 provides a division of the clock frequency by 28 at line 168 and further provides a desirable waveform symmetry. This signal from line 168 is directed to one input of an AND gate 170. The outputs of gates 154 and 170 are provided in common at line 172 which is coupled to line 174 which, in turn, is coupled with output line 140 as described earlier in conjunction with FIG. 1. Line 174 additionally, however, is directed to the input of an 8-stage binary counter 176. Thus, either the divide by 32 or divide by 28 output at line 172 is directed to counter 176 at which position it is divided by the value, 256. Counter 176 elects which of these drive frequencies are to be utilized, the Q output thereof at line 178 being directed to the second input of AND gate 154 and the $\overline{Q}$ output thereof being directed via line 180 to the corresponding input of AND gate 170. With this arrangement, the states of the outputs of counter 176 alter such that when line 178 is at a logic high, the 2800 Hz output is provided from gate 154 and while the $\overline{Q}$ terminal of counter 176 is high, a 3200 Hz signal is provided from gate 170. Output line 180 is shown coupled via line 182 to an AND gate 184, the opposite input thereto emanating from line 186 which, in turn, is coupled to output line 164. Accordingly, at the termination of one full warble period the output of gate 184 at line 188 assumes a high value which is received at the reset terminal of 5-stage binary counter 150 to reinitiate the count procedure.

Other implementations of the frequency derivation will occur to those skilled in the art, for example, shift registers configured as a Johnson counter may be utilized.

Returning to FIG. 1, drive frequency output line 140 is shown directed to a transmission gate 190 which is the solid-state equivalent of a single pole, single throw switch. Gate 190 is controlled from a conventional latch represented at 192, a line 194 being shown extending therebetween. Latch 192, in turn, is controlled from line 196 extending from energy detection and switching logic network 64. Line 196 is additionally represented in FIG. 3 as extending from the common collector connection of Darlington coupled transistors $Q_1$, $Q_2$. Accordingly, an enabling signal is directed to latch 192 from network 64 representing the validation of a ring signal, whereupon gate 190 is actuated to permit the passage of drive frequency signals along line 198. A square waveshape representative of these signals is depicted immediately above the latter line. The noted alternating drive frequency signals then are directed along two paths to slew rate controlled drive stages represented generally at 200 and 202. One path is directed through a phase inverting amplifier 204 which provides, at the output thereof at line 206, a 180° phase inversion. The signal at line 206 is directed through current limiting resistor R11 and into the input of an operational amplifier 205 of stage 200. The output of amplifier 205 at line 207 is coupled with a feedback path including line 208 and capacitor C3 to provide a classic integrator configuration. Accordingly, the current that is summed at the input of amplifier 204 is a function of its output and the input applied. The resultant output at line 206 then becomes a trapezoidal shaped waveform as represented at the output and which is directed to piezoelectric crystal 120.

The second drive frequency path is provided at line 210 which is directly coupled through current limiting resistor R12 to the input of an operational amplifier 212. As before, the output at line 214 of amplifier 212 is connected with a feedback path including line 216 and capacitor C4 to provide an integration stage identical to that at 200. Accordingly, the drive output at line 214 provides a trapezoidal wave output as represented by the waveform adjacent thereto which is antiphase in relationship to the waveform at output line 206. Line 214 is shown directed to an opposite input to piezoelectric crystal 120. A level shift providing a higher voltage output from stages 200 and 202 is made available by a high voltage input thereto from high voltage regulator 78. In this regard, amplifier 212 receives this higher voltage level from line 218, while amplifier 204 derives the regulated higher voltage input from lines 218 and 220.

The slew rate controlled trapezoidal waveshape output of stages 200 and 202 is quite valuable both in terms of deriving improved degrees of loudness from the piezoelectric crystal drive 120 as well as from the standpoint of providing an enhanced quality of sound. Without such correction of the waveshape, a square wave drive would be evolved which exhibits very high harmonic content. By applying the integration developed at stages 200 and 202, that high harmonic content is avoided such that more energy is available in the fundamental, a situation leading to improved sound quality. Further, principal power is present in the fundamental where it is desired. Inasmuch as piezoelectric crystal drives as at 120 exhibit a capacitive characteristic, the use of power dissipating resistors or the like to correct for current surges occasioned by driving such crystal elements are avoided and such otherwise lost power now is available for the production of sound. The final result is a provision of a higher level or loudness as well as sound quality in the output of the diaphragm type audio device driven by piezoelectric crystal 120.

The power efficiency of ringer circuit 10 has been found to be of such quality that, as an option, an "off chip" variable resistor may be provided as represented in phantom at 224. Thus, simple, manually actuable electronic volume control may be realized in replacement of earlier, mechanical volume controls.

Since certain changes may be made in the above-described system and apparatus without departing from the scope of the invention herein involved, it is intended that all matter contained in the description thereof or shown in the accompanying drawings shall be interpreted as illustrative and not in a limiting sense.

I claim:

1. A telephone ringer circuit comprising:

conductive means connectible to receive telephonic signals including ring and talk signals;

rectifier means having an input coupled with said conductive means for rectifying said telephonic signals and providing a corresponding d.c. signal at an output thereof;

talk disconnect means coupled with said output of said rectifier means for blocking said d.c. signals having a voltage level corresponding with said talk signals and conducting said d.c. signals above said level at an output;

energy responsive network means including resistor means coupled with said talk disconnect means output and connectible in charging relationship with capacitor means, first switching means normally enabling a discharge path for said capacitor means and actuable for effecting the blockage of said path, second switching means normally enabling the charging of said capacitor means through said resistor means and actuable to effect a low impedance current conveying bypass of said resistor means and detect network means responsive to charge values on said capacitor means representing a said d.c. signal corresponding with a ring signal for assuming an operational condition actuating said first and second switching means;

oscillator network means energizable for generating squarewave outputs of at least two frequency values alternating at a select warble rate;

drive circuit means connectible with an audio drive component and responsive to said squarewave outputs when enabled, said drive circuit means comprising two amplification stages and an inverter stage coupled with one said amplification stage for effecting the push-pull energization of said component; and control circuit means responsive to said detect network means when in said operational condition for effecting the energization of said oscillator network means and enablement of said driver circuit means.

2. The telephone ringer circuit of claim 1 in which said energy responsive network means includes discharge resistor means connectible in said discharge path with said capacitor means and coupled with said first switching means, said discharge resistor means having an impedance value selected for substantially maintaining said charge values on said capacitor means corresponding with a ring signal for an interval sufficient for said threshold responsive means to assume said conductive state.

3. The telephone ringer circuit of claim 2 wherein said control circuit means includes latch means responsive to said energy responsive network means condition for providing a signal enabling said driver means throughout the presence of said condition; and
   including clamp network means coupled with said rectifier means output for dissipating high voltage spurious pulses and comprising threshold responsive means conductive in the presence of said spurious pulses having voltage values above a level selected above said d.c. signals corresponding with said ring and talk signals, and silicon controlled rectifier means coupled between said rectifier means output and ground and gateable into conduction in response to said threshold responsive conduction.

4. A telephone ringer circuit for use in driving an audio device, comprising:
   conductive means connectible to receive telephonic signals including ring and talk signals;
   rectifier means having an input coupled with said conductive means for rectifying said telephone signals and providing a d.c. signal corresponding therewith at an output;
   talk disconnect means coupled with said rectifier means output for blocking said d.c. signals having a voltage level corresponding with said talk signals and conducting said d.c. signals above said level;
   energy responsive network means coupled to receive said conducted d.c. signals for evaluating and conducting only those d.c. signals corresponding with a valid said ring signal;
   oscillator network means energizable for generating squarewave outputs of at least two frequency values alternating at a select warble rate;
   drive circuit means including a first amplification stage configured as an integrator, having an output connectible with said audio device and energizable for receiving and selectively amplifying said squarewave signal to generate a slewrate controlled substantially trapezoidalwave signal at said output for exciting said crystal; and
   control circuit means for receiving said energy responsive network means conducted signals and effecting the energization of said oscillator network means and said first amplification stage.

5. The telephone ringer circuit of claim 4 in which:
said drive circuit means includes inverter means for receiving said squarewave signal and shifting the phase thereof 180°; and
a second amplification stage configured as an integrator, having an input for receiving said phase shifted squarewave signal, having an output connectible with said audio device and energizable for receiving and selectively amplifying said phase shifted squarewave signal to generate a slewrate controlled substantially trapezoidalwave signal at said output for exciting said audio device in push-pull association with said first amplification stage.

6. The telephone ringer circuit of claim 5 in which said first and second amplification stages are configured as operational amplifiers having capacitive feedback paths.

7. The telephone ringer circuit of claim 5 in which said control circuit means includes voltage regulator means responsive to said energy responsive network means conducted d.c. signals for selectively energizing said oscillator network means and said first and second amplification stages.

8. The telephone ringer circuit of claim 5 in which said control circuit means includes latch means responsive to said energy responsive network means for providing a signal for enabling said driver means first amplification stage and said inverter means to receive said squarewave signal.

9. The telephone ringer circuit of claim 8 wherein said circuit means includes transmission gate means coupled to receive said oscillator network means squarewave outputs, said gate means being coupled with said driver means and responsive to said latch means signal for effecting the conveyance of said squarewave outputs to said driver means.

10. The telephone ringer circuit of claim 4 including clamp network means coupled with said rectifier means output for dissipating high voltage spurious pulses and comprising threshold responsive means conductive in the presence of said spurious pulses having voltage values above a level selected above said d.c. signals corresponding with said ring signal, and gate controlled thyristor means coupled between said rectifier means output and ground and gateable into conduction in response to said threshold responsive means conduction.

11. A ringer circuit for use in driving the audio drive component of a telephonic audio annunciator, comprising:
   conductive means connectible to receive telephone signals including ring and talk signals;
   rectifier means having an input coupled with said conductive means for rectifying said telephonic signals and providing a d.c. signal corresponding therewith at an output;
   talk disconnect means coupled with said rectifier means output for blocking said d.c. signals having a voltage level corresponding with said talk signals and conducting said d.c. signals above said level;
   energy responsive network means including resistor means coupled with said talk disconnect means output and connectible in charging relationship with capacitor means, first switching means normally enabling a discharge path for said capacitor means and actuable for disabling said path, second switching means normally enabling the charging of said capacitor means through said resistor means and actuable to effect a low impedance current by-pass of said resistor means, and detect network means responsive to charge values on said capacitor means representing a said d.c. signal corresponding with a ring signal for assuming an operational condition actuating said first and second switching means;
   oscillator network means energizable for generating a squarewave output;
   drive circuit means including a first amplification stage configured as an integrator, having an output connectible with said audio drive component and energizable for receiving and selectively amplifying said squarewave signal to generate a substantially trapezoidalwave signal at said output for exciting said crystal; and control circuit means responsive to said detect network means when in said operational condition for receiving current conveyed by said by-pass to effect the select energization of said oscillator network means and said first amplification stage.

12. The ringer circuit of claim 11 in which said drive circuit means includes:

inverter means for receiving said squarewave signal and shifting the phase thereof 180°;

a second amplification stage configured as an integrator, having an input for receiving said phase shifted squarewave signal, having an output connectible with said audio drive component and energizable for receiving and selectively amplifying said phase shifted squarewave signal to generate a substantially trapezoidal signal at said output for exciting said crystal in push-pull association with said first amplification stage.

13. The ringer circuit of claim 12 in which said first and second amplification stages are configured as operational amplifiers having capacitive feedback paths.

14. The ringer circuit of claim 12 in which said control circuit means includes voltage regulator means responsive to said energy responsive network means conducted d.c. signals for selectively energizing said oscillator network means and said first and second amplification stages.

15. The ringer circuit of claim 12 in which said control circuit means includes latch means responsive to said energy responsive network means for providing a signal for enabling said driver means first amplification stage and said inverter means to receive said squarewave signal.

16. The ringer circuit of claim 11 in which said detect network means includes:

threshold responsive means responsive to said capacitor means for assuming a conductive state when said charge value corresponds with a said ring signal; and third solid-state switching means actuable in response to said threshold responsive means conductive state for simultaneously actuating said first and second switching means.

17. The telephone ringer circuit of claim 16 in which said energy responsive network means includes discharge resistor means connectible in said discharge path with said capacitor means and coupled with said first switching means, said discharge resistor means having an impedance value selected for substantially maintaining said charge values on said capacitor means corresponding with a ring signal for an interval sufficient to said threshold responsive means to assume said conductive state.

18. The telephone ringer circuit of claim 16 in which said first switching means comprises at least one transistor stage coupled intermediate said discharge resistor means and ground, means normally forwardly biasing said transistor stage into a conductive state, and means responsive to said third solid-state switching means actuation for removing said forward bias.

19. The telephone ringer circuit of claim 16 in which said second switching means comprises at least one transistor stage having emitter and collector electrodes coupled in shunt about said energy responsive network resistor means and forward biased into conduction in response to said third solid-state switching means actuation.

20. The telephone ringer circuit of claim 11 including clamp network means coupled with said rectifier means output for dissipating high voltage spurious pulses and comprising threshold responsive means conductive in the presence of said spurious pulses having voltage values above a level selected above said d.c. signals corresponding with said ring signal, and gate controlled thyristor means coupled between said rectifier means output and ground and gateable into conduction in response to said threshold responsive means conduction.

* * * * *